US 012579254B2

(12) United States Patent
Ackerman

(10) Patent No.: US 12,579,254 B2
(45) Date of Patent: Mar. 17, 2026

(54) SUPPLEMENTAL ATTACK SURFACE SCANNER (SASS) CONFIGURATION INTEGRATION COMPONENT

(71) Applicant: Bank of America Corporation, Charlotte, NC (US)

(72) Inventor: Eric Colin Ackerman, Danville, PA (US)

(73) Assignee: Bank of America Corporation, Charlotte, NC (US)

( * ) Notice: Subject to any disclaimer, the term of this patent is extended or adjusted under 35 U.S.C. 154(b) by 83 days.

(21) Appl. No.: 18/819,112

(22) Filed: Aug. 29, 2024

(65) Prior Publication Data

US 2026/0064829 A1     Mar. 5, 2026

(51) Int. Cl.
G06F 21/57          (2013.01)
G06F 21/53          (2013.01)

(52) U.S. Cl.
CPC ............ G06F 21/53 (2013.01); G06F 21/577 (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 10,845,402 B2* | 11/2020 | Fukui | ................. | G01R 29/0892 |
| 2023/0289412 A1* | 9/2023 | Saberidokht | ........... | G06N 20/20 |
| 2024/0419791 A1* | 12/2024 | Croak | ................... | G06F 21/554 |

* cited by examiner

*Primary Examiner* — Fatoumata Traore
(74) *Attorney, Agent, or Firm* — Weiss & Arons LLP

(57)          ABSTRACT

Methods, systems, and apparatus may be provided for a configuration integration component (CIC) that integrates security policies for security scanning of computing machines in a sequestered network of an entity using a proprietary security scanning application with the security scanning of computing machines in an enterprise network of the entity using a security scanning application of a third-party vendor. Controls, including parameters, for the proprietary security scanning application may be obtained by the CIC based on controls provided in a security scanning application of a third-party vendor. The CIC may use the obtained controls and a library that maps the same or similar controls from the vendor application to the proprietary application to generate a configuration file that may be exported, such as via the enterprise network, to the sequestered network to scan attack surfaces of the computing machines in the sequestered network.

20 Claims, 12 Drawing Sheets

900

OBTAIN SCANNING POLICY FILE FOR FIRST COMPUTER SECURITY SCANNING APPLICATION — 902

PROVIDE A SECOND COMPUTER SECURITY SCANNING APPLICATION FOR SEQUESTERED NETWORK — 904

GENERATE CONTROL LIBRARY WITH MAPPING OF SCANNING CONTROLS — 906

GENERATE CONFIGURATION FILE FOR USE IN SECURITY SCANNING IN THE SEQUESTERED NETWORK — 908

EXPORT THE CONFIGURATION FILE TO THE SEQUESTERED NETWORK — 910

Illustrative Example of Preconfigured SASS CIC Control Library (CSV File)

```
VendorControlId,SassControlId,ReferenceObject,Comparison,Expected 1183,registryValue,HKEY_LOCAL_MACHINE\SOFTWARE\Microsoft\Windows\CurrentVersion\Policies\Explorer\
NoDriveTypeAutoRun,regExContainedIn
```

FIG. 5

Illustrative Example of SASS Configuration Integration Component Executable File

```
C:/>
C:/>sass_cic.exe
   SASS Configuration Integration Component
   Converting policy from vendor (Vendor[1],Vendor[2]): 1
   Name of Policy to convert: IIS Checks Testing
   API URL for Vendor 1 subscription: https://apps.vendor1.com/pc
   API credential user: bankguy
   API credential password: ***********
   Control ID prefix ([Enter] for none): 8000
   Comment controls in output that are 'inactive' in vendor policy (Y/N): Y
   Connecting to Vendor 1 API...
   Downloading policy "IIS Checks Testing"...
   Converting policy...
   WARNING: Vendor 1 control 21124 has no equivalent in SASS.
   Finished converting policy. SASS policy saved as [IIS-Checks_Testing.csv]
C:/>
```

FIG. 6

Illustrative Example of SASS_CIC Policy in XML format downloaded from Vendor 1

```
<?xml version="1.0" encoding="UTF-8"?>
<POLICY>
    <TITLE><![CDATA[IIS Checks Testing]]></TITLE>
    <EXPORTED><![CDATA[2024-07-09T18:45:40Z]]></EXPORTED>
    <COVER_PAGE><![CDATA[]]></COVER_PAGE>
    <STATUS><![CDATA[active]]></STATUS>
    <TECHNOLOGIES total="8">
        <TECHNOLOGY>
            <ID>21</ID>
            <NAME>Windows 2008 Server</NAME>
        </TECHNOLOGY>
        <TECHNOLOGY>
            <ID>53</ID>
            <NAME>Windows 2012 Server</NAME>
        </TECHNOLOGY>
        <TECHNOLOGY>
            <ID>57</ID>
            <NAME>MS IIS 7.x</NAME>
        </TECHNOLOGY>
        <TECHNOLOGY>
            <ID>70</ID>
            <NAME>MS IIS 8.x</NAME>
        </TECHNOLOGY>
        <TECHNOLOGY>
            <ID>75</ID>
            <NAME>Windows Server 2012 R2</NAME>
        </TECHNOLOGY>
        <TECHNOLOGY>
            <ID>106</ID>
            <NAME>Windows 2016 Server</NAME>
        </TECHNOLOGY>
        <TECHNOLOGY>
            <ID>111</ID>
            <NAME>MS IIS 10.x</NAME>
        </TECHNOLOGY>
        <TECHNOLOGY>
            <ID>180</ID>
            <NAME>Windows 2019 Server</NAME>
```

FIG. 7A

```
<TECHNOLOGY>
<TECHNOLOGIES>
<SECTIONS total="2">
   <SECTION>
     <NUMBER>1</NUMBER>
     <HEADING><![CDATA[Windows Registry Checks]]></HEADING>
     <CONTROLS total="1">
         <CONTROL>
            <ID>1183</ID>
            <CRITICALITY>
                <LABEL><![CDATA[3-HIGH]]></LABEL>
                <VALUE>3</VALUE>
            <CRITICALITY>
            <REFERENCE_TEXT><![CDATA[Baseline 123 Section 4]]></
REFERENCE_TEXT>
            <IS_CONTROL_DISABLE><![CDATA[0]]></IS_CONTROL_DISABLE>
            <TECHNOLOGIES total="5">
                <TECHNOLOGY>
                    <ID>21</ID>
                    <NAME>Windows 2008 Server</NAME>
                    <EVALUATE><CTRL><DP><K>secman.system.disableautoplay</
K><OP><FV set="0">145</FV><FV set="0">181</FV><FV set="1">255/FV><FV
set="1">314159265358979</FV><FV 149:255</V></DP></CTRL></EVALUATE>
                    <REMEDIATION/>
                </TECHNOLOGY>
                <TECHNOLOGY>
                    <ID>53</ID>
                    <NAME>Windows 2012 Server</NAME>
                    <EVALUATE><CTRL><DP><K>secman.system.disableautoplay</
K><OP>in</OP><FV set="0">145</FV><FV set="0">181</FV><FV set="1">255/FV
><FV set="1">314159265358979</FV><FV149:255</V></DP></CTRL></EVALUATE>
                    <REMEDIATION/>
                </TECHNOLOGY>
                <TECHNOLOGY>
                    <ID>75</ID>
                    <NAME>Windows Server 2012 R2</NAME>
                    <EVALUATE><CTRL><DP><K>secman.system.disableautoplay</
K><OP><FV set="0">145</FV><FV set="0">181</FV><FV set="1">255/FV><FV
set="1">314159265358979</FV><V>149:255</V></DP></CTRL></EVALUATE>
                    <REMEDIATION/> ─► Continue to FIG. 7C
```

FIG. 7B

```
<TECHNOLOGY>
    <ID>106</ID>
    <NAME>Windows 2016 Server</NAME>
    <EVALUATE><CTRL><DP><K>secman.system.disableautoplay</
K><OP><FV set="0">145</FV><FV set="0">181</FV><FV set="1">255/FV><FV
set="1">314159265358979</FV><V>149:255</V></DP></CTRL></EVALUATE>
    <REMEDIATION/>
</TECHNOLOGY>
<TECHNOLOGY>
    <ID>180</ID>
    <NAME>Windows 2019 Server</NAME>
    <EVALUATE><CTRL><DP><K>secman.system.disableautoplay</
K><OP>in</OP<FV set="0">145</FV><FV set="0">181</FV><FV set="1">255/FV>
<FV set="1">314159265358979</FV><V>149:255</V></DP></CTRL></EVALUATE>
    <REMEDIATION/>
</TECHNOLOGY>
</TECHNOLOGIES>
</CONTROL>
</CONTROLS>
</SECTION>
<SECTION>
    <NUMBER>2</NUMBER>
    <HEADING><![CDATA[IIS]]Checks]]></HEADING>
    <CONTROLS total="1">
    <CONTROL>
        <ID>21124/ID>
        <CRITICALITY>
            <LABEL><![CDATA[3-HIGH]]></LABEL>
            <VALUE>3</VALUE>
        <CRITICALITY>
        <REFERENCE_TEXT><![CDATA[Not implemented in SASS]]></
REFERENCE_TEXT>
        <IS_CONTROL_DISABLE><![CDATA[0]]></IS_CONTROL_DISABLE>
        <TECHNOLOGIES total="3">
            <TECHNOLOGY>
                <ID>57</ID>
                <NAME>MS IIS 7.x</NAME>
<EVALUATE><CTRL><DP><K>iis7.secman.general.script
ErrorSentToBrowser</K><CD>matches</CD><OP>xre</OP><V><![CDATA[.*]]><V><
FV set="1">314159265358979</FV><FV set="1">161803399999999</FV></DP></
CTRL><EVALUATE>
```

```
                    <REMEDIATION/>
                </TECHNOLOGY>
                <TECHNOLOGY>
                    <ID>70</ID>
                    <NAME>MS IIS 8.x</NAME>
<EVALUATE><CTRL><DP><K>iis7.secman.general.script
ErrorSentToBrowser</K><CD>matches</CD><OP>xre</OP><V><![CDATA[.*]]></V>
<FV set="1">314159265358979</FV><FV set="1">161803399999999</FV></DP></
CTRL></EVALUATE>
                    <REMEDIATION/>
                </TECHNOLOGY>
                <TECHNOLOGY>
                    <ID>111</ID>
                    <NAME>MS IIS 10.x</NAME>
<EVALUATE><CTRL><DP><K>iis7.secman.general.script
ErrorSentToBrowser</K><CD>matches</CD><OP>xre</OP><V><![CDATA[.*]]><V><
FV set="1">314159265358979</FV><FV set="1">161803399999999</FV></DP></
CTRL></EVALUATE>
                    <REMEDIATION/>
                </TECHNOLOGY>
            </TECHNOLOGIES>
          </CONTROL>
        </CONTROLS>
      </SECTION>
    </SECTIONS>
</POLICY>
```

FIG. 7D

```
#POLICY:IIS Checks Testing,,,,,,,

#DATE:2024-07-08,,,,,,,

#VERSION:1,,,,,,,

#MsgRecID,Applicability,MessageTitle,Severity,ReferenceObject,Reference,Comparison,
Expected,NotFoundOK 89001183,MemberServer,Status of the 'Disable Autorun for all drives' setting for the
HKLM key,3,registryValue,HKEY_LOCAL_MACHINE\SOFTWARE\Microsoft\Windows\CurrentVersion\
Policies\Explorer\NoDriveTypeAutoRun,regExContainedIn,"^149$~,^255$",0

#890021124,NotSupported,,,,,,,
```

FIG. 8

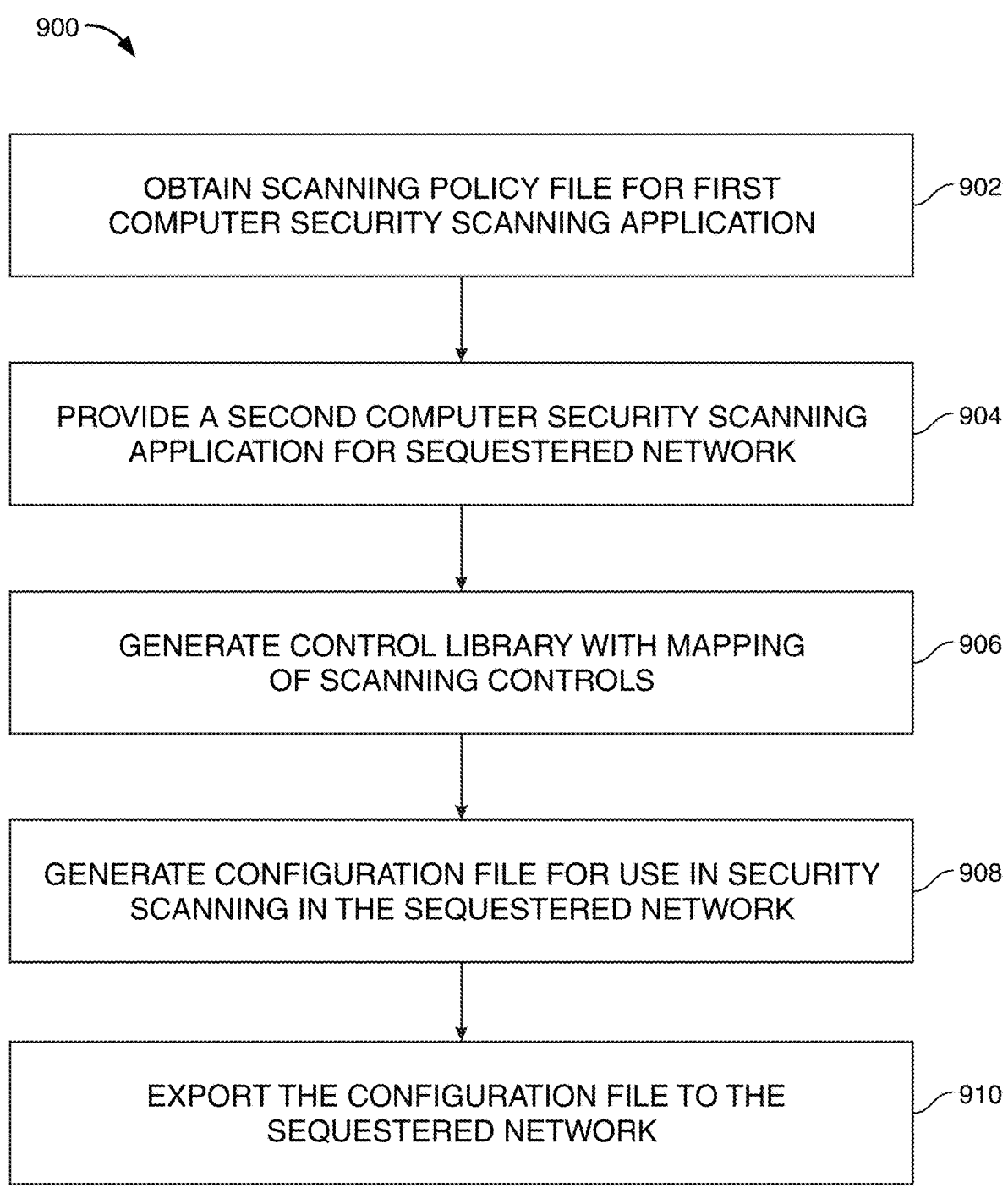

900

OBTAIN SCANNING POLICY FILE FOR FIRST
COMPUTER SECURITY SCANNING APPLICATION — 902

PROVIDE A SECOND COMPUTER SECURITY SCANNING
APPLICATION FOR SEQUESTERED NETWORK — 904

GENERATE CONTROL LIBRARY WITH MAPPING
OF SCANNING CONTROLS — 906

GENERATE CONFIGURATION FILE FOR USE IN SECURITY
SCANNING IN THE SEQUESTERED NETWORK — 908

EXPORT THE CONFIGURATION FILE TO THE
SEQUESTERED NETWORK — 910

FIG. 9

SUPPLEMENTAL ATTACK SURFACE SCANNER (SASS) CONFIGURATION INTEGRATION COMPONENT

FIELD OF THE DISCLOSURE

Aspects of the disclosure relate to security scanning of a computer in a sequestered network.

BACKGROUND OF THE DISCLOSURE

Entities, such as enterprises like financial institutions, may be required to maintain a high level of security for data that is sensitive. To ensure that sensitive data is very restricted, some computing machines may be sequestered within a network (a "sequestered network") that is separate from a network that connects the other of the entity's computing machines ("enterprise network"). The sequestered computing machines may be sequestered even to the exclusion of enterprise-wide security monitoring scanning teams to minimize vulnerabilities in the sequestered network. This makes monitoring vulnerabilities and baseline configuration scanning of the restricted-access, sequestered computing machines difficult. While one or more scanning applications from third-party vendors may be used to scan computing machines in the enterprise network, use of scanning application from a third-party vendor may not be permitted in the sequestered network.

It would be desirable to enable monitoring of vulnerabilities and performance of baseline configuration security scans on sequestered computing machines that use a security policy that includes scanning controls with parameters similar to a security policy used by the third-party vendor to perform scans on computing machines in the entity's enterprise network. However, it is challenging to recreate the controls with parameters for each update of the third-party vendor's controls and parameters, especially given frequent updates to tackle newly-discovered vulnerabilities.

SUMMARY OF THE DISCLOSURE

It is an object of this invention to provide a system and method for generating a configuration file for security scanning of computing machines in a sequestered network using a proprietary computer security scanning application while automatically incorporating a security scanning policy of a third-party vendor for controls to be used in scanning the sequestered network.

A method in accordance with the present disclosure may be implemented by automatically generating a configuration file for use in security scanning of a first computing machine in a sequestered network by integrating into the configuration file at least a portion of a first security scanning policy used in a first computer security scanning application sourced from a third-party vendor. The method may include obtaining, by a processor that is external to the sequestered network from an application program interface (API) of the third-party vendor, a scanning policy file that represents the first security scanning policy. The scanning policy file may include a first set of scanning controls available for use in the first computer security scanning application for scanning a second computing machine in an enterprise network. The method may be implemented by a configuration integration component that may include the processor, a memory, and may include a configuration integration component application.

The method may include providing, by an entity, a second computer security scanning application that includes a second set of scanning controls to be used for scanning the first computing machine. The provided second computer security scanning application may be generated by the entity or obtained from a second party. The method may include generating, by the entity, a control library that is configured to map the first set of scanning controls to corresponding controls in the second set of scanning controls. The method may include automatically generating, by the processor, the configuration file for use by the second computer security scanning application that is configured for use within the sequestered network by converting the scanning controls with the scanning policy file that are to be included in the configuration file based on the control library.

The second computer security scanning application may be proprietary to an entity that is different from the third-party vendor. The second computer security scanning application may be configured to scan the first computing machine in the sequestered network. The sequestered network may not have a pipeline to the Internet and may only be accessible by a group of users at the entity. The sequestered network may be isolated from an enterprise network of the entity so that the first computer security scanning application cannot be used in the sequestered network.

The processor may obtain the scanning policy file by accessing a subscription by the entity to the first computer security scanning application of the third-party vendor. The API may be a published vendor API.

The method may include exporting, by the processor, the configuration file to the sequestered network to be used by the second computer security scanning application to enable performance of a security scan on the first computing machine using the second computer security scanning application.

The method may include automatically obtaining, by the processor from the API of the third-party vendor, an update by the third-party vendor to the scanning policy file that includes one or more changes to the first set of scanning controls. The method may include generating, by the processor, an updated security policy for the first computing machine in the sequestered network comprising an updated set of security controls to be incorporated into the second computer security scanning application based on the update to the scanning policy file of the third-party vendor.

The third-party vendor may be one of multiple third-party vendors to which the entity subscribes for computer security support. The method may include selecting, by the entity, the third-party vendor from the multiple third-party vendors to obtain the scanning policy file comprising the first set of scanning controls used in the first computer security scanning application. The method may include generating, by the processor, a separate control library for each of the multiple third-party vendors.

When the first set of scanning controls does not include information for one or more parameters in the second set of scanning controls, the method may include generating, by the processor, dummy data to be substituted in the second set of scanning controls for the one or more parameters, and including the dummy data in the configuration file. When the first set of scanning controls includes one or more scanning controls that are not in the second set of scanning controls, the method may include omitting the one or more scanning controls from the configuration file.

The configuration file may be configured to be used to scan the first computing machine using some or all of the scanning controls in the configuration file.

The second computer security scanning application may scan attack surfaces of the first computing machine.

The second set of scanning controls in the control library may be specified in a comma-separated values (csv) format. The scanning policy file obtained from the third-party vendor may be obtained in an extensible markup language (xml) format. The second set of scanning controls in the control library may be transformed to the csv format for inclusion in the configuration file. The second set of scanning controls may include parameters for controlling the security scanning of the first computing machine.

The third-party vendor may be a software-as-a-service provider. The third-party vendor may be located on the premises of the entity.

One or more non-transitory computer-readable media in accordance with the present disclosure may be implemented by storing computer-executable instructions, which, when executed by a processor on a computer system, perform a method for automatically generating a configuration file for use in security scanning of a first computing machine in a sequestered network by integrating into the configuration file at least a portion of a first security scanning policy used in a first computer security scanning application sourced from a third-party vendor. The processor may be external to the sequestered network.

The method may include obtaining, by the processor from an application program interface (API) of the third-party vendor, a scanning policy file that represents the first security scanning policy. The scanning policy file may include a first set of scanning controls available for use in the first computer security scanning application for scanning a second computing machine in an enterprise network. The method may include providing, by an entity, a second computer security scanning application comprising a second set of scanning controls to be used for scanning the first computing machine. The provided second computer security scanning application may be generated by the entity or obtained from a second party. The method may include generating, by the entity, a control library that is configured to map the first set of scanning controls to corresponding controls in the second set of scanning controls. The method may include automatically generating, by the processor, the configuration file for use by the second computer security scanning application that is configured for use within the sequestered network by converting the scanning controls in the scanning policy file to be included in the configuration file based on the control library. The second computer security scanning application may be proprietary to an entity, different from the third-party vendor. The second computer scanning application may be configured to scan the first computing machine in the sequestered network.

The sequestered network may not have a pipeline to the Internet and may only be accessible by a group of users at the entity. The sequestered network may be isolated from an enterprise network of the entity so that the first computer security scanning application cannot be used in the sequestered network.

The method may include automatically obtaining from the third-party vendor an update to the scanning policy file of the third-party vendor that includes one or more changes to the first set of scanning controls. The method may include generating an updated security policy to be incorporated into the second computer security scanning application based on the update to the scanning policy file of the third-party vendor.

The third-party vendor may be one of multiple third-party vendors to which the entity subscribes for computer security support. The method may include selecting, by the entity, the third-party vendor from the multiple third-party vendors for security scanning of the first computing machine to obtain the scanning policy file that may include the first set of scanning controls used in the first computer security scanning application.

The security scanning may scan attack surfaces of the first computing machine. The first set of scanning controls may not include information for one or more parameters in the second set of scanning controls.

The method may include generating dummy data to be substituted in the second set of scanning controls for the one or more parameters; and including the dummy data in the configuration file.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 5 shows an illustrative preconfigured control library for a configuration integration component in accordance with principles of the disclosure.

FIG. 6 shows an illustrative executable command line embodiment of a configuration integration component application in accordance with principles of the disclosure.

FIG. 7A shows a first portion of an illustrative security scanning policy that may be obtained from a vendor in accordance with principles of the disclosure.

FIG. 7B shows a second portion of the illustrative security scanning policy that may be obtained from the vendor in accordance with principles of the disclosure.

FIG. 7C shows a third portion of the illustrative security scanning policy that may be obtained from the vendor in accordance with principles of the disclosure.

FIG. 7D shows a fourth portion of the illustrative security scanning policy that may be obtained from the vendor in accordance with principles of the disclosure.

FIG. 8 shows an illustrative file that may be output from the configuration integration component and may include a security scanning policy in accordance with principles of the disclosure.

FIG. 9 shows an illustrative example of a flow chart of a method for generating a configuration file to be used for scanning sequestered computing machines in accordance with principles of the disclosure.

DETAILED DESCRIPTION OF THE DISCLOSURE

Figure 1:
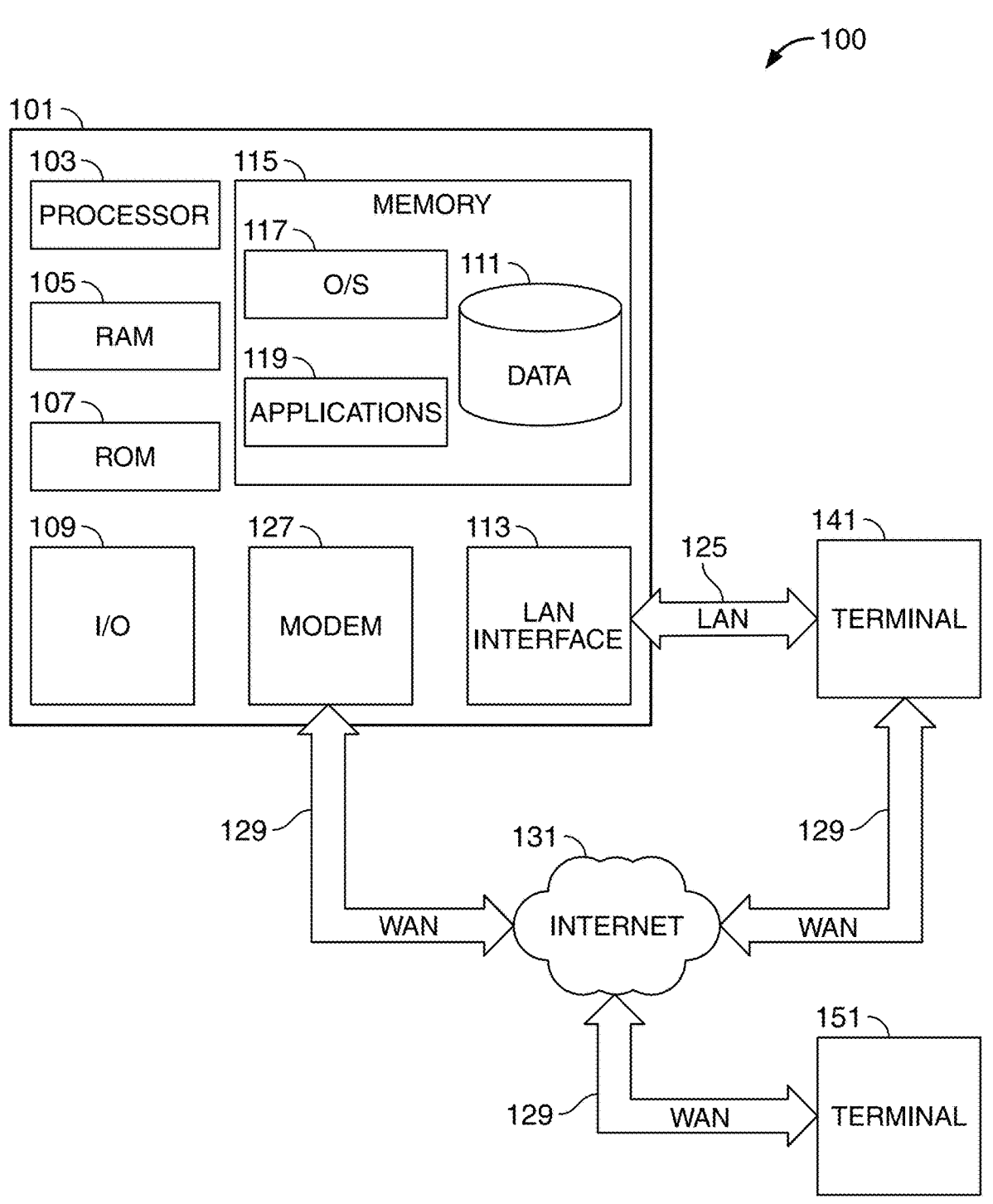
FIG. 1 shows an illustrative system architecture in accordance with principles of the disclosure.

Methods, systems, and apparatus may be provided for a configuration integration component (CIC) that at least partially integrates the configuration for security scanning of a computing machines in a sequestered network of an entity with the configuration for security scanning of computing machines in an enterprise network of the entity. CIC may include a processor and a memory and may be associated with a server. CIC may be located inside or outside of the enterprise network.

The methods, systems, and apparatus may automatically determine which controls, and parameters or settings for those controls, to use with a second security scanning application to scan the computing machines in the sequestered network. Second security scanning application may be created as proprietary for use by the entity to scan the computing machines in the sequestered network. The entity may create the application itself or may obtain the application from a second party. The controls and parameters and settings may be based on controls, parameters, or settings provided in a security scanning application of a third-party vendor. These controls may be obtained from a file downloadable from a published vendor API.

The security scanning application of the third-party vendor may be an application that is configured to scan computing machines in an enterprise network that is not sequestered. The security scanning application of the third-party vendor may not be used for scanning the computing machines in the sequestered network, such as due to security reasons. Thus, the proprietary security scanning application may be used in the sequestered network. Because the third-party vendor may be an expert in computer security, the configuration integration component may allow the proprietary scanning application to advantageously incorporate some or all controls and parameters used by the vendor security scanning application in the proprietary security scanning application. The proprietary security scanning application may be termed a supplemental attack surface scanner (SASS).

An entity may subscribe to one or more security scanning services provided by a third-party vendor or multiple third-party vendors to provide security and compliance solutions that may monitor the entity's IT assets and may scan potential attack surfaces within a network at which a security breach may occur. The vendor security software may include a software-as-a-service (SaaS) solution that may be resident on a cloud network or may include an on-prem solution that may be implemented on the premises of the entity.

While the security software solution for an enterprise may be very secure, it may be desirable for an entity to better maintain the sequestration of computing devices in a sequestered network by providing a security scanner that is proprietary to the entity and is maintained within the sequestered network. Nevertheless, the entity may wish to, where possible, include within its proprietary scanner for the sequestered network many, if not all, of the features performed by the scanning software of one or more of the third-party vendors that is used for the entity's enterprise network. A file may be created by the entity with the same or similar features offered at a particular point in time by a third-party vendor. However, updates may be regularly made by the third-party vendor to its security scanning policy. The controls and parameters for the controls may be updated and the surfaces that are monitored for attacks may also change frequently as attacks proliferate.

A system may allow a security scanning policy for sequestered computing machines to be automatically generated. The security policy may include some or all features of a security scanning policy for enterprise-wide computing machines that are not sequestered by leveraging information extracted from a security scanning file from the third-party vendor.

As used herein, a sequestered or "airgapped," network may be sequestered relative to an enterprise network. The enterprise network and the sequestered network environments may be under control of the same person or entity.

Table 1 lists features of an illustrative sequestered network environment.

TABLE 1

Illustrative feature

No network traffic runs between the sequestered network and the enterprise network, except network traffic that is specifically allowed through the sequestered network perimeter firewall.
No direct or indirect network connections from the sequestered network to the Internet are allowed.
The sequestered network is managed by a small, dedicated team, and is not accessible to enterprise IT teams.
No management interface hosted outside the sequestered network can be used to access systems within the sequestered network.
Remote scanning of systems within the sequestered network, using administrative credentials over a network connection, is not allowed.
Configuration and vulnerability data from systems in the sequestered network must be stored within the sequestered network or the enterprise network (e.g., no storage of data in the public cloud).
No non-Microsoft ® resident software is allowed on systems within the sequestered network.
Sequestered network is managed by designated persons, with no control by persons designated to manage enterprise network.
Other suitable features The computer integration component may include a processor, may include a memory, and may include a CIC application. The computer integration component may operate on or in conjunction with a server.

U.S. Pat. No. 11,546,355, entitled Supplemental Attack Surface Scanner, describes methods, systems, and apparatus that may be used in conjunction with the methods, systems, and apparatus described herein. U.S. Pat. No. 11,546,355 is hereby incorporated by reference as though fully set forth herein.

Illustrative embodiments of methods, systems, and apparatus in accordance with the principles of the invention will now be described with reference to the accompanying drawings, which form a part hereof. It is to be understood that other embodiments may be used, and structural, functional, and procedural modifications may be made without departing from the scope and spirit of the present invention.

The drawings show illustrative features of methods, systems, and apparatus in accordance with the principles of the invention. The features are illustrated in the context of selected embodiments. It will be understood that features shown in connection with one of the embodiments may be practiced in accordance with the principles of the invention along with features shown in connection with another of the embodiments.

The methods, apparatus, computer program products, and systems described herein are illustrative and may involve some or all the steps of the illustrative methods and/or some or all of the features of the illustrative system or apparatus. The steps of the methods may be performed in an order other than the order shown or described herein. Some embodiments may omit steps shown or described in connection with the illustrative methods. Some embodiments may include steps that are not shown or described in connection with the illustrative methods, but rather are shown or described in a different portion of the specification.

FIG. 1 shows an illustrative block diagram of system 100 that includes computer 101. Computer 101 may alternatively be referred to herein as an "engine," "server" or a "computing device." Computer 101 may be any computing device described herein, such as the computing devices running on a computer, smart phones, smart cars, smart cards, and any other mobile device described herein. Elements of system 100, including computer 101, may be used to implement various aspects of the systems and methods disclosed herein.

Computer 101 may have a processor 103 for controlling the operation of the device and its associated components, and may include RAM 105, ROM 107, input/output circuit 109, and a non-transitory or non-volatile memory 115. Machine-readable memory may be configured to store information in machine-readable data structures. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of computer 101. Memory 115 may also store videos, text, and/or audio assistance files. The data stored in Memory 115 may also be stored in cache memory, or any other suitable memory.

Input/output ("I/O") module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

Computer 101 may be connected to other systems via a local area network (LAN) interface 113. Computer 101 may operate in a networked environment supporting connections to one or more remote computers, such as terminals 141 and 151. Terminals 141 and 151 may be personal computers or servers that include many or all the elements described above relative to computer 101.

In some embodiments, computer 101 and/or Terminals 141 and 151 may be any of mobile devices that may be in electronic communication with consumer device 106 via LAN, WAN, or any other suitable short-range communication when a network connection may not be established.

When used in a LAN networking environment, computer 101 is connected to LAN 125 through a LAN interface 113 or an adapter. When used in a WAN networking environment, computer 101 may include a communications device, such as modem 127 or other means, for establishing communications over WAN 129, such as Internet 131.

In some embodiments, computer 101 may be connected to one or more other systems via a short-range communication network (not shown). In these embodiments, computer 101 may communicate with one or more other terminals 141 and 151, such as the mobile devices described herein etc., using a personal area network (PAN) such as Bluetooth®, NFC (Near Field Communication), ZigBee, or any other suitable personal area network.

It will be appreciated that the network connections shown are illustrative and other means of establishing a communications link between computers may be used. The existence of various well-known protocols such as TCP/IP, Ethernet, NFT, HTTP, and the like is presumed, and the system can be operated in a client-server configuration to permit retrieval of data from a web-based server or API (Application Programming Interface). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application programs 119 may use one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may use the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

One or more of applications 119 may include one or more algorithms that may be used to implement features of the disclosure.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, Blackberry™, tablet, smartphone, or any other computing system for receiving, storing, transmitting, and/or displaying relevant information. Terminal 151 and/or terminal 141 may be one or more user devices. Terminals 151 and 141 may be identical to computer 101 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, and/or smartphones, multiprocessor systems, microprocessor-based systems, cloud-based systems, programmable consumer electronics, network PCs, minicomputers, mainframe computers, distributed computing environments that include any of the above systems or devices, and the like.

Figure 2:
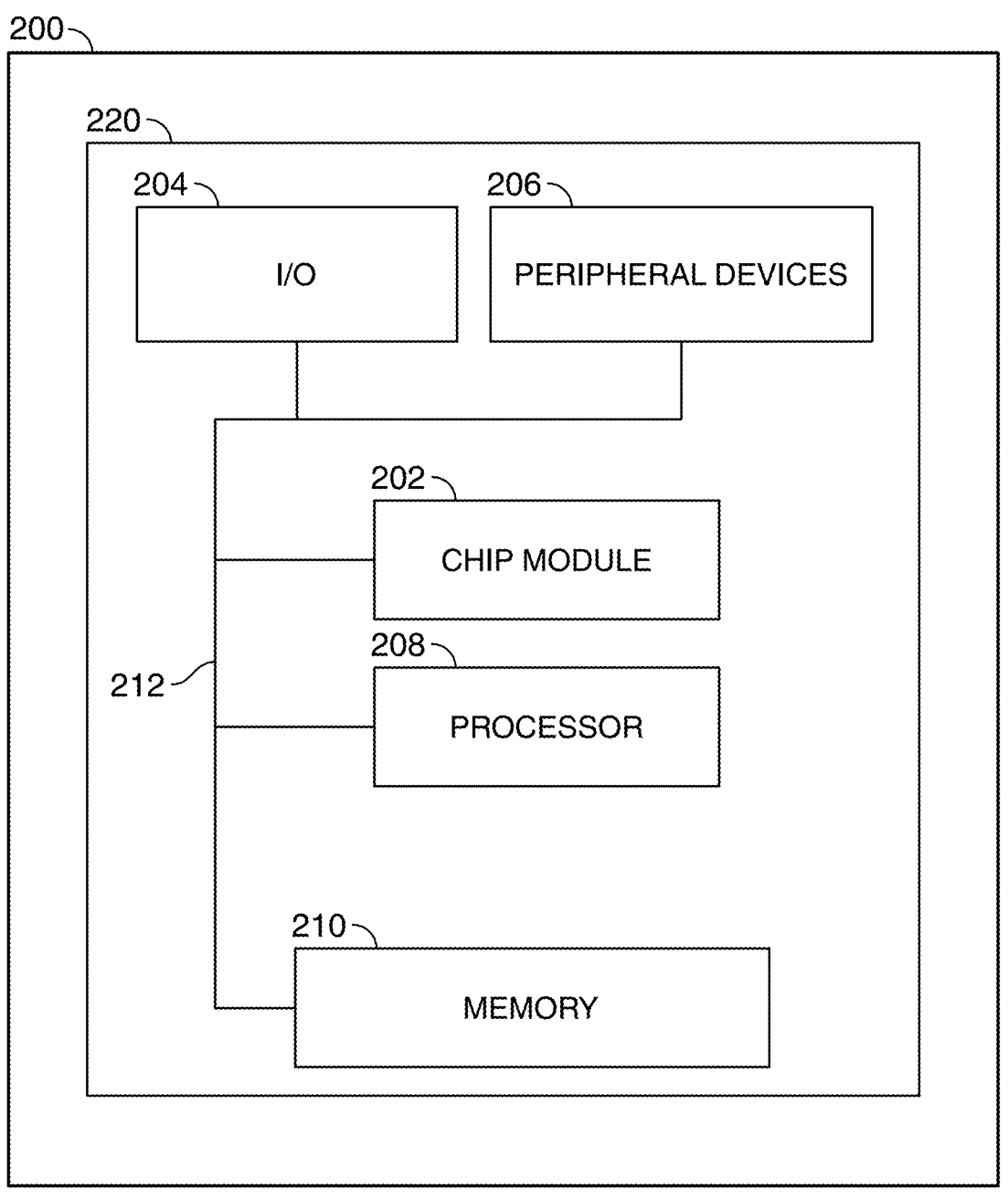
FIG. 2 shows an illustrative apparatus of a device in accordance with principles of the disclosure.

FIG. 2 shows illustrative apparatus 200, which may be a computing device. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY level hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
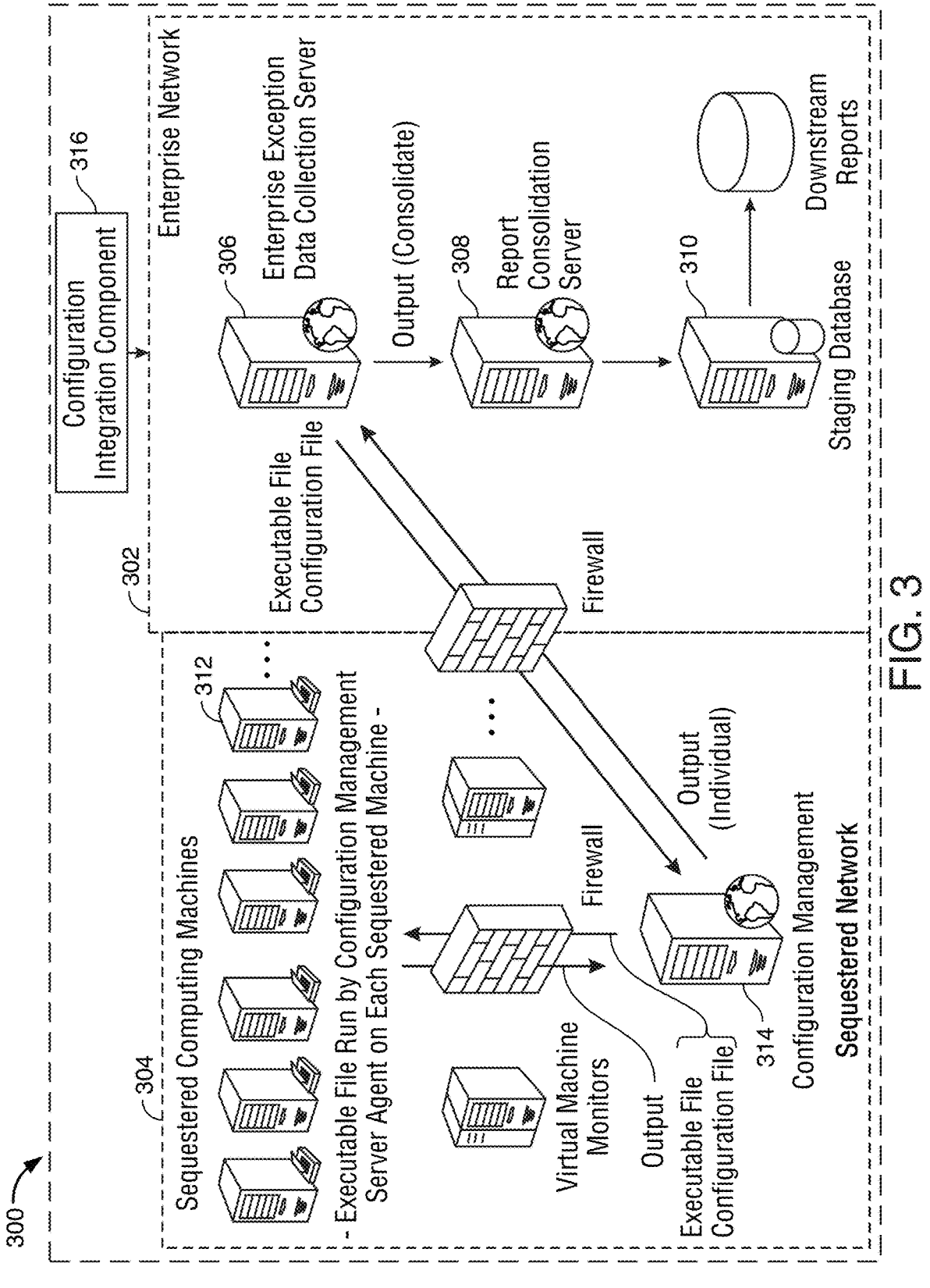
FIG. 3 shows an illustrative system architecture in accordance with principles of the disclosure.

FIG. 3 shows illustrative architecture 300 for security scanning. Architecture 300 may include enterprise network 302. Architecture 300 may include sequestered network 304. Architecture 300 may include configuration integration component 316.

Enterprise network 302 may include enterprise exception-data collection server 306. Enterprise network 302 may include enterprise data report consolidation server 308. Enterprise network 302 may include enterprise staging database 310.

Enterprise exception-data collection server 306 may collect configuration exception information from enterprise computing machines (not shown). The exception information may include scanning output that indicates differences between an expected machine configuration and a configuration observed during scanning.

Enterprise exception-data collection server 306 may consolidate the exception information. Enterprise exception-data collection server 306 may transmit the consolidated exception information to staging database 310. Staging database 310 may provide downstream reports to enterprise entities who may take corrective action in response to the reports.

Enterprise exception-data collection server 306 may exchange information with machines that are in communication with a wide area network, such as the Internet.

Sequestered network 304 may include multiple computing machines 312. Sequestered computing machines 312 may be sequestered from the wide area network. Enterprise exception-data collection server 306 may be prohibited from communicating directly with sequestered computing machines 312. Each of the multiple computing machines may be set to be accessed only by the group of users. Each machine may be a machine that does not have a pipeline to the Internet.

To scan sequestered computing machines 312, enterprise exception-data collection server 306 may provide to configuration management server 314 an executable file and a configuration file. The configuration file may include a list of vulnerabilities or configuration issues. The configuration file may be formatted as CSV. The executable file may ignore commented-out records in the configuration file, which may be identified with a "#." Configuration management server 314 may create, for each of the sequestered computing machines 312, an agent to pass the executable file and the configuration file to the sequestered computing machine. On each of sequestered computing machines 312, the agent executes the executable file. The executable file compares expected configuration records from the configuration file to scanned configuration records from the sequestered computing machine. The executable file generates output that includes exceptions based on differences between the expected configuration records from the configuration file and the scanned configuration records from the sequestered computing machine.

Configuration integration component 316 may operate in conjunction with enterprise network 302 to generate the configuration file to be passed to sequestered network 304. The configuration file may include parameters and initial settings for the security scanning application that may be performed in the sequestered network. Computing machines within enterprise network 302 may be scanned for security checks using a security scanning application selected from one or more third-party vendors as those computing machines are not sequestered. However, sequestered computing machines 312 may only be scanned with a proprietary security scanning application that is configured for use only within the sequestered network. The proprietary security scanning application may be developed by the entity operating the computing machines on the enterprise network.

Configuration integration component 316 may be configured with a proprietary security policy that includes security controls and parameters that may be used as a default for scanning computing machines in the sequestered network. However, it may be desirable to scan the sequestered computing machines 312 with the same or different (e.g., additional) protection than the security policy used by the third-party vendor for the application used to scan computing machines in the enterprise network. Configuration integration component 316 may be used to obtain the security policy from one or more third-party vendors and formulate or revise the proprietary security policy to include both security checks to be performed as well as parameters that may be used to perform the security checks on computing machine 312.

The agent returns the output to configuration management server 314. Configuration management server 314 returns the output to enterprise exception-data collection server. Configuration management server 314 may return the output to enterprise network 302 for inclusion in a consolidated report, as described in U.S. Pat. No. 11,546,355.

Figure 4:
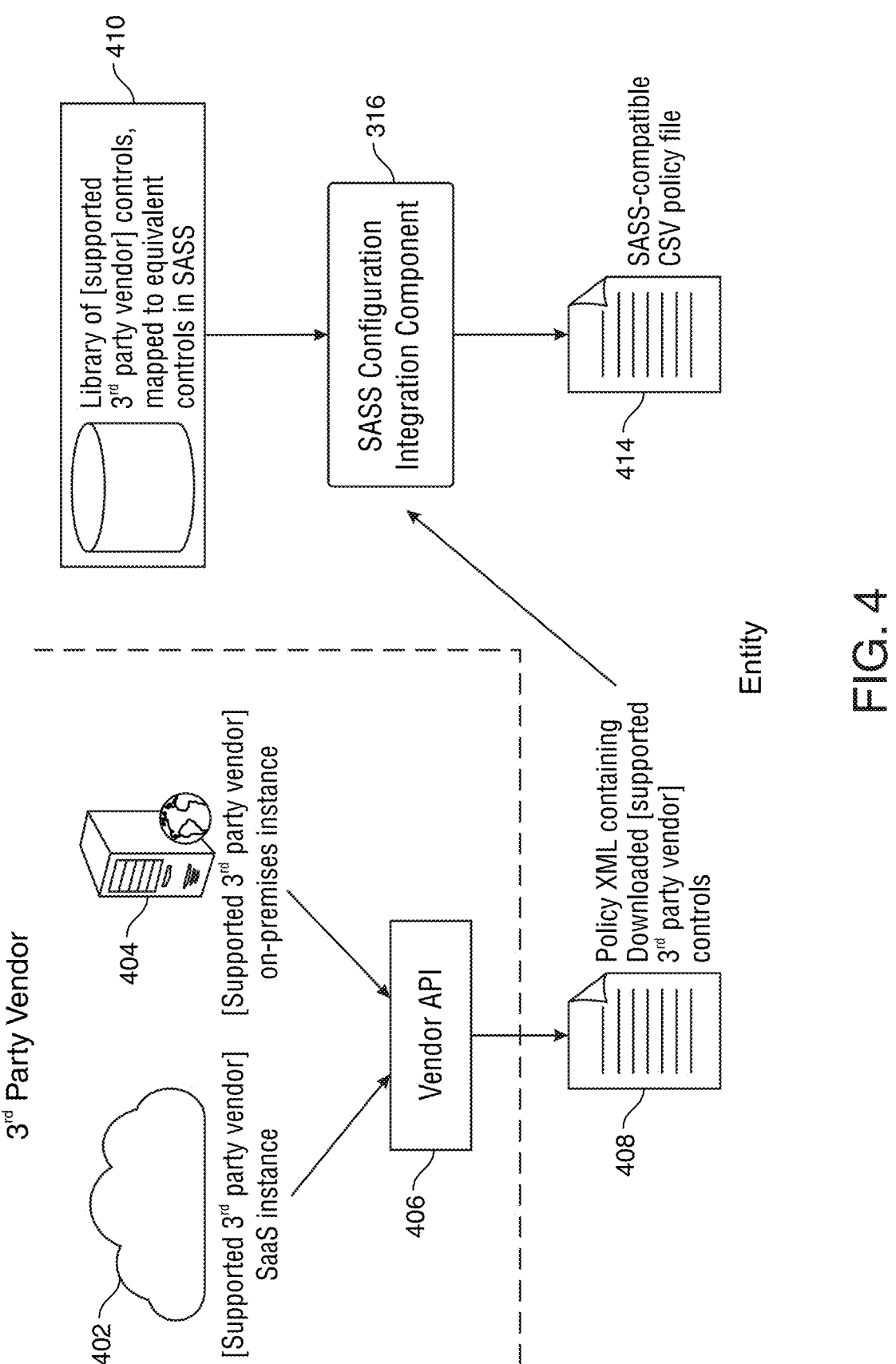
FIG. 4 shows an illustrative system architecture in accordance with principles of the disclosure.

FIG. 4 shows an illustrative flow diagram of steps and system architecture that may be used in generating configuration integration component 316.

An entity, such as the enterprise that operates enterprise network 302, may generate an initial preconfigured electronic control library 410 that maps security controls from a third-party vendor to equivalent security controls that have been used to operate on its sequestered network 304. If the enterprise subscribes to multiple third-party vendors for security scanning, a separate control library may be generated for each of the third-party vendors. Control library 410 may be created in a comma-separated values (csv) format. In embodiments, control library 410 may be generated with artificial intelligence (AI), such as may be based on previous similar libraries with this vendor or a different vendor.

Entity may obtain instances of a security policy of a third-party vendor directly from the vendor. The security policy may include third-party vendor controls, such as parameters used by the vendor for security scanning of computing machines. The vendor controls that are downloaded may be the most recent version of the vendor controls. The vendor may provide support for obtaining these files via a published API.

The security policy may be obtained from a third-party vendor in different ways. A security policy instance 408 (control instance) may be obtained from the vendor as an SaaS instance 402 with security policy instance by being downloaded from the cloud through a published API 406 for a vendor. Security policy instance 408 may be obtained by the entity from on-premises computing equipment 404 operated by the third-party vendor. Security policy instance 408 may be obtained in an xml format or in another format that is compatible with configuration integration component 316. New security scanning policy instances may be obtained from the vendor from the vendor when the vendor updates its security scanning controls or parameters for the controls.

Configuration integration component 316 may be configured to receive a notification generated by the third-party vendor, such as via the cloud or from on-premises computing equipment 404, that notifies the configuration integration component 316 that an updated security policy file is available. Configuration integration component 316 may be configured to periodically check whether a new security policy file to update the previous security policy is available from the third-party vendor.

Controls in security policy instance 408 may be extracted by configuration integration component 316 and incorporated into a security policy file 414 that is SASS-compatible, i.e., in a format that is compatible for use by the sequestered network. Security policy instance 408 may include controls corresponding to controls used by the third-party vendor for security scanning. The extracted controls may be transmitted to configuration integration component 316 where security policy file 414 may be generated based on the mapping of controls in control library 410. File 414 may also be generated based on additional controls that may not yet be included in control library 410, and may be based on current parameters for the controls. File 414 may be output from configuration integration component 316.

Configuration integration component 316 may only support policy conversion for controls that scan components only from a second party. For example, configuration integration component 316 may only scan Microsoft Windows components. Dummy output controls and processing messages may be generated in cases where one of the third-party vendor controls did not include parameters for any Windows technologies (e.g., Linux-oriented controls).

Configuration integration component 316 may create dummy controls in output from component 316 for vendor controls that have no equivalent listed in control library 410. Alternatively, when vendor controls include controls not included in control library 410, configuration integration component 316 may omit the controls not included in control library 410 from the configuration file.

In cases where a third-party vendor control referenced multiple versions of Windows technologies, configuration integration component 316 may convert the parameters associated with the most recent/highest product version in the control. For example, if the vendor control supported separate parameters for Windows Server 2016 and Windows Server 2019, configuration integration component 316 may convert only the Windows Server 2019 parameters into a single control.

In cases where the third-party vendor control referenced Microsoft Windows domain controller technologies, configuration integration component 316 may generate a "domaincontroller"-type control in the security scanning policy output. In cases where the vendor control referenced non-domain controller technologies, configuration integration component 316 may generate a "memberserver"-type control in the security scanning policy output. If the vendor control references both domain controller and non-domain controller technologies, configuration integration component 316 may generate two separate controls in the output.

If a third-party vendor control is configured to "pass" if no scanning results are found on the target, configuration integration component 316 may translate that into a "NotFoundOK=1" in the resulting control. Otherwise, configuration integration component 316 may default to the "NotFoundOK=0" setting.

By default, configuration integration component 316 may use the third-party vendor's numeric ID for a given control as the control ID in the output security scanning policy. However, the user may be able to specify a "prefix" to add to the vendor ID if needed. If a particular third-party control is found to be marked as "inactive," configuration integration component 316 may still convert the control but may provide the option to mark "comment out" the control in the resulting security scanning policy file.

Security policy file 414 that is SASS-compatible for use in the sequestered network may thus implement the downloaded security policy with controls to be used in scanning the sequestered computing machines in the sequestered network. Like the control library 410, SASS-compatible security policy file 414 may also be in csv format. File 414 may be exported by enterprise network 302 over a firewall to configuration management server 314 in sequestered network 304.

FIG. 5 shows an illustrative preconfigured control library 500 that may include a mapping of some or all controls, and parameters or settings for the controls, found in a third-party vendor scanner security policy to an entity's scanner security policy for the entity's sequestered network. For example, each control may be listed as follows:

> #VendorControlId,SassContrlId,ReferenceObject,Comparison,Expected where VendorControlId identifies a particular third-party vendor control, SassContrlId identifies a control at the entity's sequestered network that corresponds to the identified vendor control, ReferenceObject identifies the technical area of the check (e.g., registry, local security settings, etc.) for this control, Comparison represents a type of comparison to be performed, and Expected represents results of the comparison against data found.

Both the vendor's security policies and the entity's security policies may include similar sets of controls or different sets of controls to scan for certain attempted surface attacks by a bad actor. The entity's security policy may include additional controls to allow for controls to be incorporated in its security policy based on a security policy of additional third-party vendors, including a second third-party vendor, a third third-party vendor, etc. By providing different control libraries for the different vendors, different controls may be obtained from different vendors for an optimized security scan of the computing machines in the sequestered network.

Not every control may be used by both the security scanning application of the third-party vendor and the proprietary security scanning application used in the sequestration network. Where there is a control in the vendor security policy that is not provided for in the entity's security policies for the proprietary security scanning application, the configuration integration component may be configured to add the control to the configuration file or to ignore that control. Where there is a control in the entity's security policy that does have a corresponding control policy that in the third-party vendor's security policy, the configuration integration component may be configured to generate dummy data to be substituted into the control for the configuration file to be supplied to the sequestration network. The inclusion of this dummy data for a particular control may signal to the proprietary security scanning application that the control is to be ignored. In other embodiments, the configuration integration component may be configured to use default controls and parameters for the control that has no corresponding control in the vendor security policy.

FIG. 6 shows an illustrative embodiment of configuration integration component 316 implemented as a command-line executable file that may be used to interactively generate the set of scanning controls to be used with the proprietary computer security scanning application for the sequestered network. An example of the configuration integration component as an executable file is shown. Examples of user data commands and fields in the configuration integration component where the user may interactively enter data is shown, for clarity, within boxes. The configuration integration component may be developed as a standalone, interactive Microsoft Windows command-line executable as shown. In embodiments, the executable file may be implemented for user interaction with a graphical user interface (GUI). Configuration integration component 316 may generate interactive feedback.

The executable file may prompt a user associated with an entity that operates the sequestered network to select a security scanning policy to be used. The selection may involve a selection of a third-party vendor with which the entity has a subscription, where the third-party vendor has a security scanning policy that may be used. The entity may have subscriptions with multiple third-party vendors that each has its own security scanning policy so that the selection of one of the multiple third-party vendors selects the security scanning policy that may be used. The selection may further include selecting a security scanning policy from multiple scanning policies that may be available at a particular vendor.

The number of vendors to which the entity may subscribe may vary. For example, the entity may subscribe to just one vendor, which may be set as a default vendor so no vendor may need to be selected. Alternatively, the entity may subscribe to two or more third-party vendors, e.g., Vendor 1, Vendor 2, etc.

The executable file may also prompt a user for entry of one or more of the following information: name of the policy to convert, such as the file IIS Checks Testing, an API URL to access the selected vendor, or API credentials, including, for example, a user ID and password. A control ID prefix may also be requested, and a yes or no entry may be requested as to whether to comment controls in output that are 'inactive' should be included in the vendor policy. The policy "IIS Checks Testing" may then be downloaded. The policy file may be downloaded in an xml format. The parameters and format may be converted with reference to a mapping in the control library generated by the entity that may be in a csv format. The conversion may be from the xml format in the IIS Checks Testing file to parameters and format to be included a configuration file IIS-Checks_Testing.csv that may be used in the sequestered network. A warning may be provided indicating that a control may be unsupported in the security scanning policy for the sequestered network (e.g., "control 21124 has no equivalent in SASS").

FIG. 7A shows a first portion of an illustrative security scanning policy file that may be downloaded from a third-party vendor Vendor 1. The file may support different versions of Microsoft Windows, for example. FIG. 7B shows a second portion of the illustrative security scanning policy file that may be obtained from the third-party vendor including parameters that may be used by Vendor 1 for security scanning of computing machines, such as attack surfaces of the computing machines. FIG. 7C shows a third portion of the illustrative security scanning policy file, including further file parameters. FIG. 7D shows a fourth portion of the illustrative security scanning policy.

FIG. 8 shows an illustrative policy file in csv format which is generated based upon the control library generated by the entity and after conversion of the set of scanning controls in the downloaded IIS Checks Testing file to the IIS_Checks_Testing.csv policy file that may be output from the configuration integration component and exported to the sequestered network. As noted in FIG. 6, control 21124 in the downloaded file from the vendor may have no equivalent in the control library and may be listed as "not supported" in the policy shown in FIG. 8. In this figure, Applicability may be the type of system the check applies to (e.g., "Domain Controller vs. Member Server", MessageTitle may be the title of the check that will appear in reporting, Severity may be the risk rating for the check, Reference may be the specific location the check is looking for (e.g., key/value within the registry), and NotFoundOK may indicate whether or not the check should 'pass' if the desired information is not found on the system.

FIG. 9 shows an illustrative example of a flow chart of a method for generating a configuration file to be used for scanning one or more computing machines in a sequestered network in accordance with principles of the disclosure. Access to the sequestered network may be restricted, but the sequestered network may be able to receive a configuration file for use in scanning computing machines the sequestered network.

At step 902, a processor that is external to the sequestered network may obtain a scanning policy file from the third-party vendor. The scanning policy file may include a first set of scanning controls available that may be available for use with a first computer security scanning application. The first computer security scanning application may be a scanning application used to scan computing machines in an enterprise network. This first computer security scanning application may be provided by the third-party vendor to subscribers or may be publicly available. The third-party vendor may provide the scanning policy file upon request.

At step 904, the entity that operates or maintains the sequestered network may provide, using a processor associated with the sequestered network, a second computer security scanning application that includes a second set of scanning controls to be used for scanning a first computing machine within the sequestered network. The second computer security scanning application may be generated by the entity or by a second party.

At step 906, the entity that operates or maintains the sequestered network may generate or maintain a control library that is configured to map the first set of scanning controls to corresponding parameters in the second set of scanning controls. The control library may be generated in different ways. In embodiments, the control library may be generated with the use of artificial intelligence (AI).

At step 908, the processor may automatically generate the configuration file for use by a second computer security scanning application that is configured for use within the sequestered network only. The configuration file may be generated by converting the parameters in the scanning policy file from the third-party vendor based on the control library and the scanning policy file.

At step 910, the processor may export the configuration file to the sequestered network to be used by the second computer security scanning application to perform a security scan on the first computing machine. The second computer security scanning application thus leverages features of the first security scanning protocol without performing security scanning of the first computing machine in the sequestered network using the first security scanning application.

Figure 10:
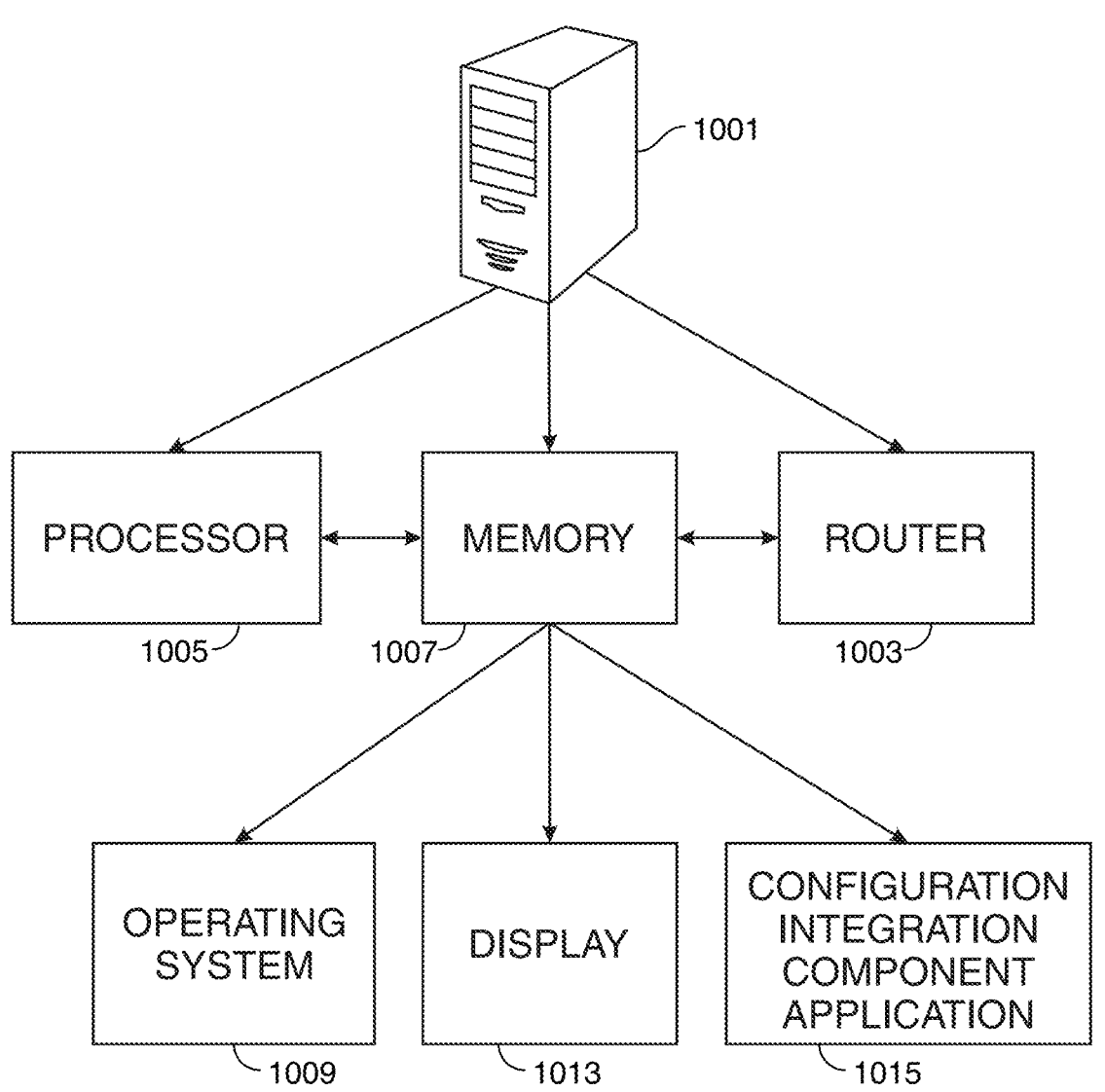
FIG. 10 shows an illustrative system architecture for the configuration integration component in accordance with principles of the disclosure.

FIG. 10 shows an illustrative system architecture for generating the configuration integration component in accordance with principles of the disclosure. The system architecture may be implemented on a server 1001 or in a cloud or on the Internet. Server 1001 may include a router 1003 to receive and transmit files, a processor 1005, and a memory 1007. Memory 1007 may include an operating system 1009, a display 1013, and may include a configuration integration component application 1015, which may be an interactive executable application. A requested security scanning policy file may be obtained from a third-party vendor, such as by using configuration integration application 1015 to request the file. A control library file for mapping controls in the third-party vendor control format to controls in the format of the proprietary security scanning application may be stored in memory 1007. A configuration file to be generated based on the security scanning policy file of the vendor and the control library file may be generated by processor 1005 and may be stored at memory 1007 for export to the sequestered network via router 1003.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Thus, methods, apparatus, and systems for configuration integration between security scanning of a computing machines in an enterprise network and computing machines in a sequestered network that use different security scanning applications to scan attack surfaces of the computing machines may be provided. Persons skilled in the art will appreciate that the present invention can be practiced by other than the described embodiments, which are presented for purposes of illustration rather than of limitation.

What is claimed is:

1. A method for automatically generating a configuration file for use in security scanning of a first computing machine in a sequestered network by integrating into the configuration file at least a portion of a first security scanning policy used in a first computer security scanning application sourced from a third-party vendor;

the method comprising:

obtaining, by a processor that is external to the sequestered network from an application program interface (API) of the third-party vendor, a scanning policy file that represents the first security scanning policy and comprises a first set of scanning controls available for use in the first computer security scanning application for scanning a second computing machine in an enterprise network;

providing, by an entity, a second computer security scanning application comprising a second set of scanning controls to be used for scanning the first computing machine;

generating, by the entity, a control library that is configured to map the first set of scanning controls to corresponding controls in the second set of scanning controls; and automatically generating, by the processor, the configuration file for use by the second computer security scanning application that is configured for use within the sequestered network by converting the scanning controls in the scanning policy file to be included in the configuration file based on the control library;

wherein:

the second computer security scanning application is proprietary to an entity, different from the third-party vendor, and is configured to scan the first computing machine in the sequestered network;

the sequestered network does not have a pipeline to the Internet and is only accessible by a group of users at the entity; and the sequestered network is isolated from an enterprise network of the entity so that the first computer security scanning application cannot be used in the sequestered network.

2. The method of claim 1, further comprising:

automatically obtaining, by the processor from the API of the third-party vendor, an update by the third-party vendor to the scanning policy file that includes one or more changes to the first set of scanning controls; and generating, by the processor, an updated security policy for the first computing machine in the sequestered network comprising an updated set of security controls to be incorporated into the second computer security scanning application based on the update to the scanning policy file of the third-party vendor.

3. The method of claim 1, wherein the API is a published vendor API.

4. The method of claim 3, wherein the processor obtains the scanning policy file by accessing a subscription by the entity to the first computer security scanning application of the third-party vendor.

5. The method of claim 1, further comprising:

exporting, by the processor, the configuration file to the sequestered network to be used by the second computer security scanning application to enable performance of a security scan on the first computing machine using the second computer security scanning application.

6. The method of claim 1, wherein the third-party vendor is one of multiple third-party vendors to which the entity subscribes for computer security support; and the method further comprises:

selecting, by the entity, the third-party vendor from the multiple third-party vendors to obtain the scanning policy file comprising the first set of scanning controls used in the first computer security scanning application.

7. The method of claim 6, wherein the method further comprises:

generating, by the processor, a separate control library for each of the multiple third-party vendors.

8. The method of claim 1, wherein, when the first set of scanning controls does not include information for one or more parameters in the second set of scanning controls, the method further comprises:

generating, by the processor, dummy data to be substituted in the second set of scanning controls for the one or more parameters; and including the dummy data in the configuration file.

9. The method of claim 1, wherein, when the first set of scanning controls includes one or more scanning controls not in the second set of scanning controls, omitting the one or more scanning controls from the configuration file.

10. The method of claim 1, wherein the configuration file is configured to be used to scan the first computing machine using some or all of the scanning controls in the configuration file.

11. The method of claim 1, wherein the second computer security scanning application scans attack surfaces of the first computing machine.

12. The method of claim 1, wherein the second set of scanning controls in the control library are specified in a comma-separated values (csv) format, the scanning policy file obtained from the third-party vendor is obtained in an extensible markup language (xml) format, and the second set of scanning controls in the control library are transformed to the csv format for inclusion in the configuration file.

13. The method of claim 1, wherein the second set of scanning controls comprises parameters for controlling the security scanning of the first computing machine.

14. The method of claim 1, wherein the third-party vendor is a software-as-a-service provider.

15. The method of claim 1, wherein the third-party vendor is located on premises of the entity.

16. One or more non-transitory computer-readable media storing computer-executable instructions, which, when executed by a processor on a computer system, perform a method for automatically generating a configuration file for use in security scanning of a first computing machine in a sequestered network by integrating into the configuration file at least a portion of a first security scanning policy used in a first computer security scanning application sourced from a third-party vendor, wherein the processor is external to the sequestered network, the method comprising:

obtaining, by the processor from an application program interface (API) of the third-party vendor, a scanning policy file that represents the first security scanning policy and comprises a first set of scanning controls available for use in the first computer security scanning application for scanning a second computing machine in an enterprise network;

providing, by an entity, a second computer security scanning application comprising a second set of scanning controls to be used for scanning the first computing machine;

generating, by the entity, a control library that is configured to map the first set of scanning controls to corresponding controls in the second set of scanning controls; and automatically generating, by the processor, the configuration file for use by the second computer security scanning application that is configured for use within the sequestered network by converting the scanning controls in the scanning policy file to be included in the configuration file based on the control library;

wherein:

the second computer security scanning application is proprietary to an entity, different from the third-party vendor, and is configured to scan the first computing machine in the sequestered network;

the sequestered network does not have a pipeline to the Internet and is only accessible by a group of users at the entity; and the sequestered network is isolated from an enterprise network of the entity so that the first computer security scanning application cannot be used in the sequestered network.

17. The computer-readable media of claim 16, wherein the method further comprises:

automatically obtaining from the third-party vendor an update to the scanning policy file of the third-party vendor that includes one or more changes to the first set of scanning controls; and generating an updated security policy to be incorporated into the second computer security scanning application based on the update to the scanning policy file of the third-party vendor.

18. The computer-readable media of claim 16, wherein the third-party vendor is one of multiple third-party vendors to which the entity subscribes for computer security support; and the method further comprises:

selecting, by the entity, the third-party vendor from the multiple third-party vendors for security scanning of the first computing machine to obtain the scanning policy file comprising the first set of scanning controls used in the first computer security scanning application.

19. The computer-readable media of claim 16, wherein the security scanning scans attack surfaces of the first computing machine.

20. The computer-readable media of claim 16, wherein, when the first set of scanning controls does not include information for one or more parameters in the second set of scanning controls, the method further comprises:

generating dummy data to be substituted in the second set of scanning controls for the one or more parameters; and including the dummy data in the configuration file.

* * * * *